United States Patent
Kagalwala et al.

(10) Patent No.: US 10,664,638 B1
(45) Date of Patent: May 26, 2020

(54) MEASURING COMPLEX STRUCTURES IN SEMICONDUCTOR FABRICATION

(71) Applicants: GLOBALFOUNDRIES INC., Grand Cayman (KY); NOVA MEASURING INSTRUMENTS LTD., Rehovot (IL)

(72) Inventors: Taher Kagalwala, Clifton Park, NY (US); Sridhar Mahendrakar, Clifton Park, NY (US); Matthew Sendelbach, Fishkill, NY (US); Alok Vaid, Clifton Park, NY (US)

(73) Assignees: GLOBALFOUNDRIES INC., Grand Cayman (KY); NOVA MEASURING INSTRUMENTS LTD., Rehovot (IL)

( * ) Notice: Subject to any disclaimer, the term of this patent is extended or adjusted under 35 U.S.C. 154(b) by 0 days.

(21) Appl. No.: 16/221,631

(22) Filed: Dec. 17, 2018

(51) Int. Cl.
*G06F 30/3323* (2020.01)
*H01L 29/78* (2006.01)
*H01L 27/11* (2006.01)
*G06F 111/20* (2020.01)
*G06F 119/18* (2020.01)

(52) U.S. Cl.
CPC ...... *G06F 30/3323* (2020.01); *H01L 27/1104* (2013.01); *H01L 29/785* (2013.01); *G06F 2111/20* (2020.01); *G06F 2119/18* (2020.01)

(58) Field of Classification Search
CPC .. H01L 27/11; H01L 27/1104; H01L 27/1116; G06F 30/33; G06F 30/303323
USPC .................................................. 716/106–107
See application file for complete search history.

(56) References Cited

U.S. PATENT DOCUMENTS

2017/0271343 A1* 9/2017 Liaw .................. H01L 27/1116

\* cited by examiner

*Primary Examiner* — Paul Dinh
(74) *Attorney, Agent, or Firm* — Alphapatent Associates, Ltd; Daniel J. Swirsky

(57) ABSTRACT

Measuring SRAM structures having FinFET transistors by obtaining, on a production semiconductor wafer, spectra of a SRAM production structure including FinFET fins and gates, identifying SRAM reference structure spectra corresponding to the spectra, the reference structure from measuring, on a reference semiconductor wafer, a reference structure including a layout of FinFET fins having gates, injecting, into an OCD model of the production structure, fin target parameter values, corresponding to the identified reference structure spectra, from measuring, on the reference wafer, a fin target including a layout of exposed FinFET fins lacking gates similar or identical to the reference structure layout, correspondence between the fin target parameter values and the reference structure spectra previously identified by ML, and determining measurement values for the FinFET gates of the production structure by fitting reference spectra associated with the production structure in the OCD model to the production structure spectra.

23 Claims, 7 Drawing Sheets

MEASURING COMPLEX STRUCTURES IN SEMICONDUCTOR FABRICATION

BACKGROUND

Advanced semiconductor technology introduces many complex structures that need to be measured in order to monitor and control the structures and the semiconductor manufacturing processes that make the structures, and adjust these processes to reduce defects and promote higher yield. As structure complexity increases, more parameters are needed to properly characterize the structures in OCD (Optical Critical Dimension) models. Unfortunately, having too many parameters in an OCD model can lead to undesirable correlations between the parameters and/or low sensitivity to changes in the parameters, often resulting in unacceptable OCD metrology measurement error. Methods for reducing the number of these parameters without worsening such measurement error would be advantageous.

SUMMARY

In one aspect of the invention a method is provided for measuring Static Random Access Memory (SRAM) structures having Fin Field-effect transistors (FinFET), including during a reference process of fabricating integrated circuits, measuring in a fin target measuring step a fin target on a reference semiconductor wafer, thereby obtaining fin target parameter values, where the fin target includes a layout of exposed FinFET fins lacking FinFET gates, measuring in a SRAM reference structure measuring step a SRAM reference structure on the reference semiconductor wafer, thereby obtaining SRAM reference structure spectra, where the SRAM reference structure includes a layout of FinFET fins having FinFET gates, and where the layout of exposed FinFET fins of the fin target is substantially similar to or identical to the layout of FinFET fins of the SRAM reference structure, performing both of the measuring steps for a plurality of different pairs of fin targets and SRAM reference structures, and performing machine learning (ML) to identify correspondence between the fin target parameter values and the SRAM reference structure spectra, thereby producing an ML solution, and during a high-volume manufacturing (HVM) process of fabricating integrated circuits, obtaining a spectra associated with a SRAM production structure on a production semiconductor wafer, where the SRAM production structure includes a plurality of FinFET fins having FinFET gates, identifying in the ML solution SRAM reference structure spectra corresponding to the spectra associated with the SRAM production structure, injecting, into an Optical Critical Dimension (OCD) model of the SRAM production structure, fin target parameter values corresponding to the identified SRAM reference structure spectra in the ML solution, and determining measurement values for the FinFET gates of the SRAM production structure by fitting a reference spectra associated with the SRAM production structure in the OCD model to the spectra associated with the SRAM production structure.

In another aspect of the invention the method further includes identifying a fabrication step performed on the reference semiconductor wafer after which the fin target includes the layout of exposed FinFET fins lacking FinFET gates, and performing the fin target measuring step after the identified fabrication step and before any other fabrication step is subsequently performed on the reference semiconductor wafer.

In another aspect of the invention the identified fabrication step is an oxide etchback process during which oxide is etched back selective to silicon material of the FinFET fins.

In another aspect of the invention the method further includes identifying a fabrication step performed on the reference semiconductor wafer after which the SRAM reference structure includes the layout of FinFET fins having FinFET gates, and performing the SRAM reference structure measuring step after the identified fabrication step and before any other fabrication step is subsequently performed on the reference semiconductor wafer.

In another aspect of the invention the identified fabrication step is poly-open chemical-mechanical planarization (CMP) of the reference semiconductor wafer.

In another aspect of the invention the fin target measuring step is performed using a Critical Dimension Scanning Electron Microscope (CD-SEM), an Atomic Force Microscope (AFM), a Critical Dimension Atomic Force Microscope (CD-AFM), or an OCD metrology tool.

In another aspect of the invention the different pairs of fin targets and SRAM reference structures have varying physical dimensions.

In another aspect of the invention the method further includes providing any of the measurements and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

In another aspect of the invention a method is provided for measuring Static Random Access Memory (SRAM) structures having Fin Field-effect transistors (FinFET), including obtaining spectra associated with a SRAM production structure on a production semiconductor wafer, where the SRAM production structure includes a plurality of FinFET fins having FinFET gates, identifying SRAM reference structure spectra corresponding to the spectra associated with the SRAM production structure, where the SRAM reference structure spectra were previously obtained from a measurement of a SRAM reference structure on a reference semiconductor wafer, the SRAM reference structure including a layout of FinFET fins having FinFET gates, injecting, into an Optical Critical Dimension (OCD) model of the SRAM production structure, fin target parameter values corresponding to the identified SRAM reference structure spectra, where the fin target parameter values were previously obtained from a measurement of a fin target on the reference semiconductor wafer, the fin target including a layout of exposed FinFET fins lacking FinFET gates, the layout of the FinFET fins of the fin target being substantially similar to or identical to the layout of the FinFET fins of the SRAM reference structure, and where correspondence between the fin target parameter values and the SRAM reference structure spectra was previously identified by machine learning (ML), and determining measurement values for the FinFET gates of the SRAM production structure by fitting reference spectra associated with the SRAM production structure in the OCD model to the spectra associated with the SRAM production structure.

In another aspect of the invention the obtaining, identifying, injecting, and determining are performed during a high-volume manufacturing (HVM) process of fabricating integrated circuits.

In another aspect of the invention the method further includes measuring in a fin target measuring step, the fin target on the reference semiconductor wafer, thereby obtaining the fin target parameter values, measuring in a SRAM reference structure measuring step the SRAM reference structure on the reference semiconductor wafer, thereby obtaining the SRAM reference structure spectra, performing both of the measuring steps for a plurality of different pairs of fin targets and SRAM reference structures, and performing the ML to identify correspondence between the fin target parameter values and the SRAM reference structure spectra.

In another aspect of the invention the measuring steps and the implementing are performed during a reference process of fabricating integrated circuits prior to the obtaining, identifying, injecting, and determining.

In another aspect of the invention the method further includes identifying a fabrication step performed on the reference semiconductor wafer after which the fin target includes the layout of exposed FinFET fins lacking FinFET gates, and performing the fin target measuring step after the identified fabrication step and before any other fabrication step is subsequently performed on the reference semiconductor wafer.

In another aspect of the invention the identified fabrication step is an oxide etchback process during which oxide is etched back selective to silicon material of the FinFET fins.

In another aspect of the invention the method further includes identifying a fabrication step performed on the reference semiconductor wafer after which the fin target includes the layout of exposed FinFET fins having FinFET gates, and performing the SRAM reference structure measuring step after the identified fabrication step and before any other fabrication step is subsequently performed on the reference semiconductor wafer.

In another aspect of the invention the identified fabrication step is poly-open chemical-mechanical planarization (CMP) of the reference semiconductor wafer.

In another aspect of the invention the fin target measuring step is performed using a Critical Dimension Scanning Electron Microscope (CD-SEM), an Atomic Force Microscope (AFM), a Critical Dimension Atomic Force Microscope (CD-AFM), or an OCD metrology tool.

In another aspect of the invention the different pairs of fin targets and SRAM reference structures have varying physical dimensions.

In another aspect of the invention the method further includes providing any of the measurement values and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

In another aspect of the invention a system is provided for measuring Static Random Access Memory (SRAM) structures having Fin Field-effect transistors (FinFET), including a reference tool, a spectrum acquisition tool, a reference process control unit configured to process fin target parameter values and SRAM reference structure spectra for a plurality of different pairs of fin targets and SRAM reference structures on a reference semiconductor wafer by performing machine learning (ML) to identify correspondence between the fin target parameter values and the SRAM reference structure spectra, thereby producing an ML solution, where the fin target parameter values are obtained from the fin targets by the reference tool, where the SRAM reference structure spectra are obtained from the SRAM reference structures by the spectrum acquisition tool, and where in each of the pairs of fin targets and SRAM reference structures the fin target includes a layout of exposed FinFET fins lacking FinFET gates, the SRAM reference structure includes a layout of FinFET fins having FinFET gates, and the layout of exposed FinFET fins of the fin target is substantially similar to or identical to the layout of FinFET fins of the SRAM reference structure, and an OCD metrology tool configured to obtain spectra associated with a SRAM production structure on a production semiconductor wafer during an HVM process of fabricating integrated circuits, where the SRAM production structure includes a plurality of FinFET fins having FinFET gates, identify in the ML solution SRAM reference structure spectra corresponding to the spectra associated with the SRAM production structure, inject, into an OCD model of the SRAM production structure, fin target parameter values corresponding to the identified SRAM reference structure spectra in the ML solution, and determine measurement values for the FinFET gates of the SRAM production structure by fitting reference spectra associated with the SRAM production structure in the OCD model to the spectra associated with the SRAM production structure.

In another aspect of the invention the fin target parameter values are obtained after a given fabrication step is performed on the reference semiconductor wafer after which the fin target includes the layout of exposed FinFET fins lacking FinFET gates and before any other fabrication step is subsequently performed on the reference semiconductor wafer.

In another aspect of the invention the reference tool is a Critical Dimension Scanning Electron Microscope (CD-SEM), an Atomic Force Microscope (AFM), a Critical Dimension Atomic Force Microscope (CD-AFM), or an OCD metrology tool.

In another aspect of the invention the OCD metrology tool is configured to provide any of the measurement values and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

In another aspect of the invention, any of the measurement values and the OCD model described herein are used to provide active feedback to a semiconductor manufacturing tool (e.g., lithography tool, etch tool, deposition tool, etc.) for controlling operation of the tool during manufacturing of semiconductors.

BRIEF DESCRIPTION OF THE DRAWINGS

Aspects of the invention will be understood and appreciated more fully from the following detailed description taken in conjunction with the appended drawings in which:

FIGS. 1A-1D show integrated circuit structures on a semiconductor wafer at various stages during their fabrication;

DETAILED DESCRIPTION

Figure 1A:
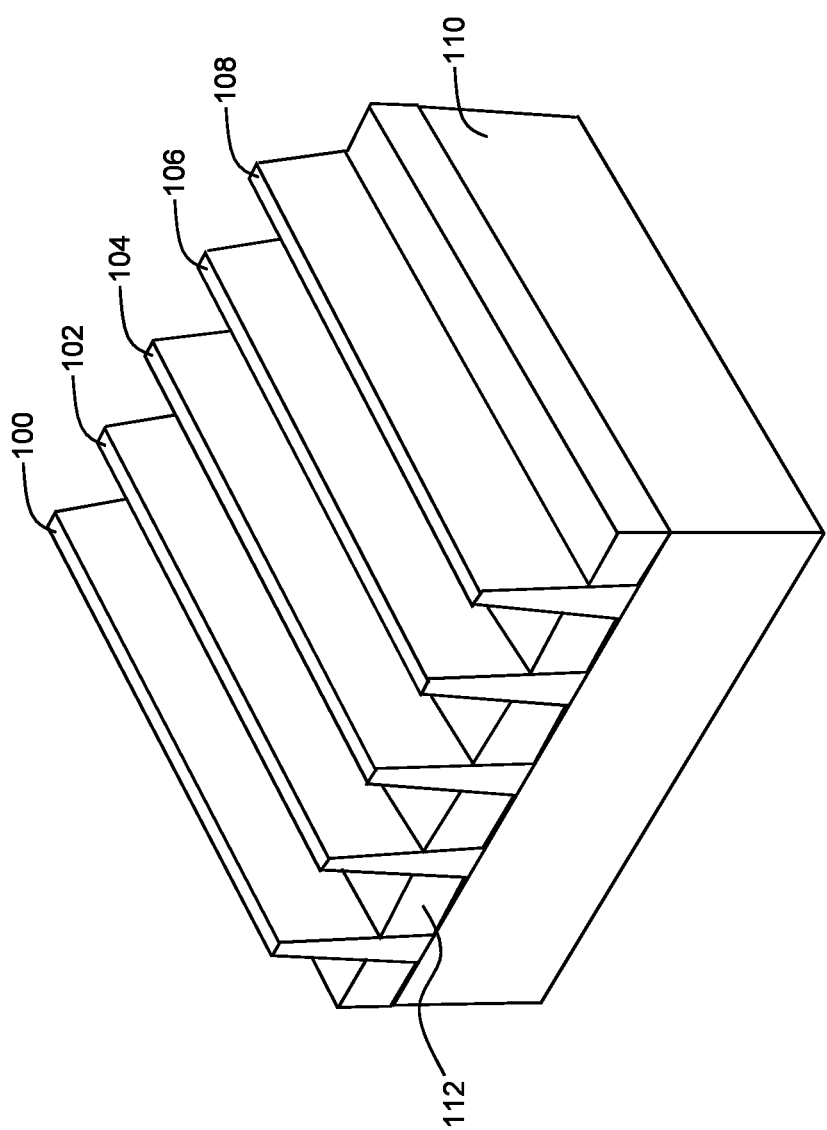
FIGS. 1A-1D are simplified conceptual illustrations useful in understanding the invention, where
Figure 1B:
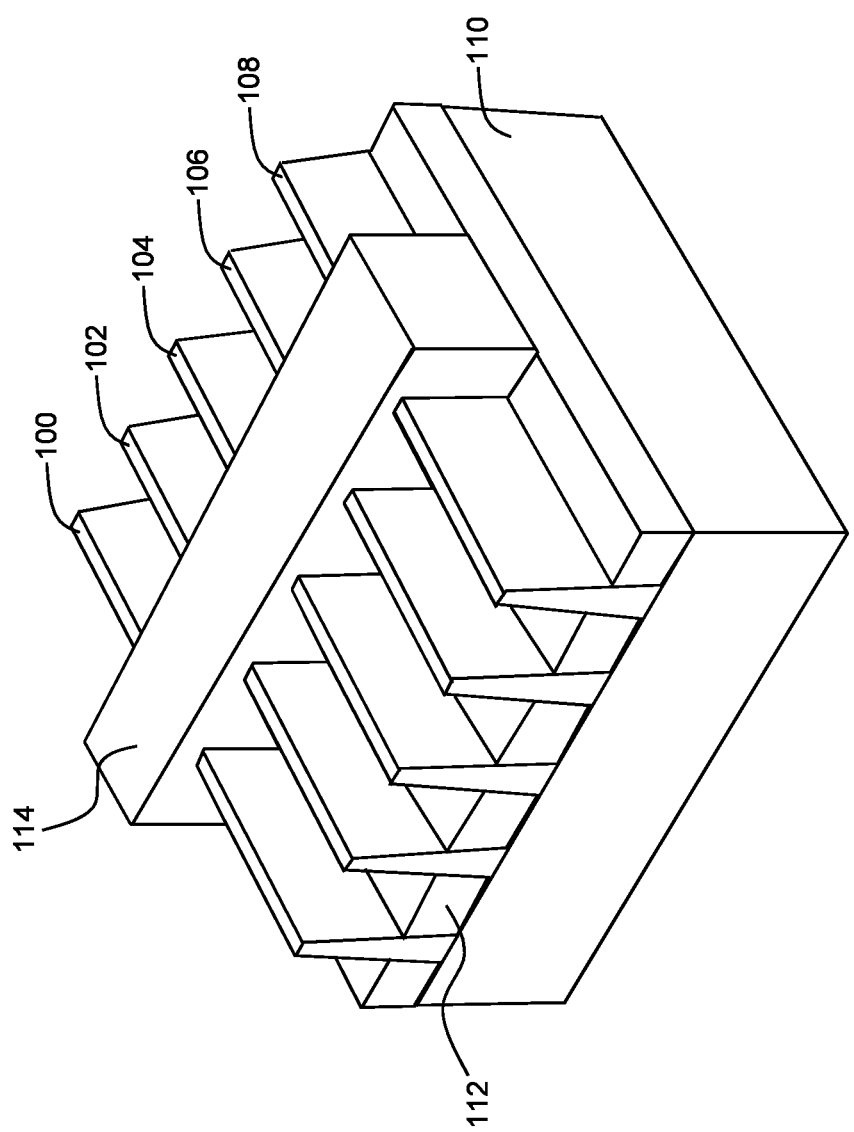
Figure 1C:
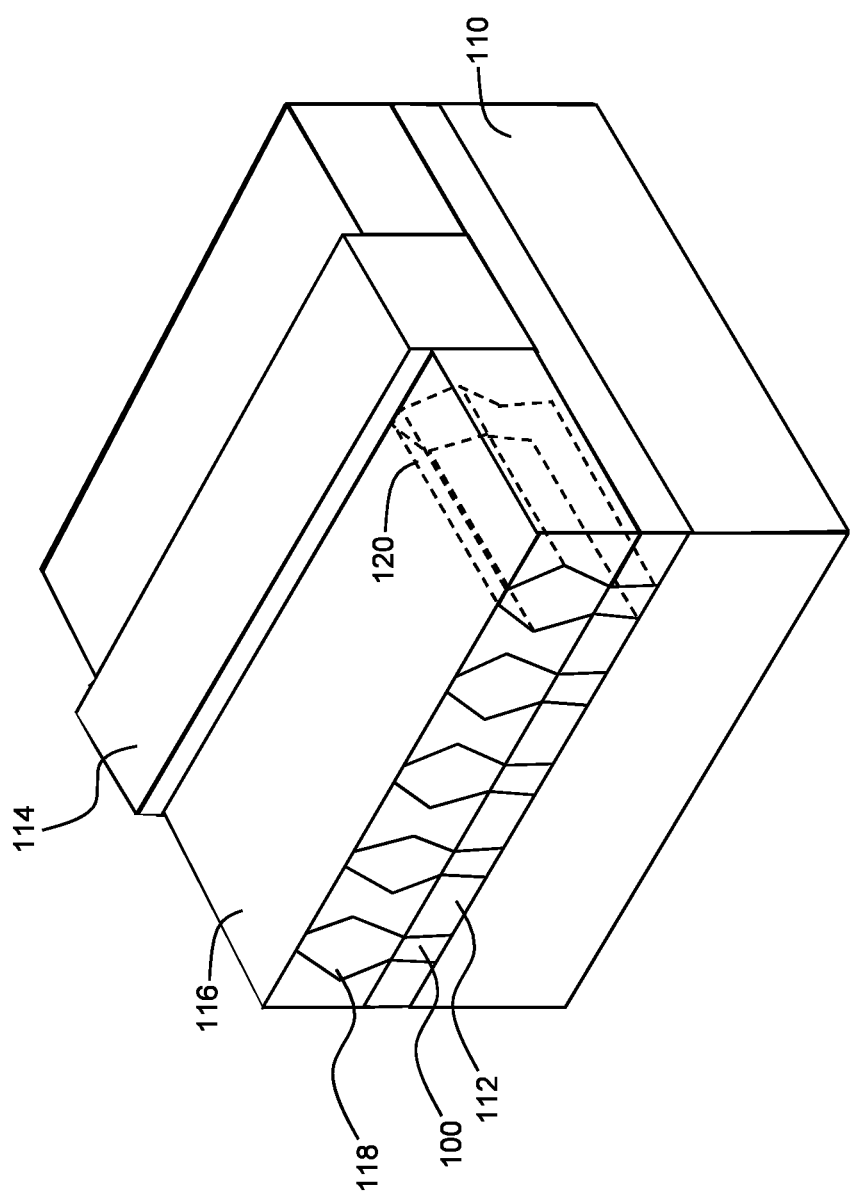
Figure 1D:
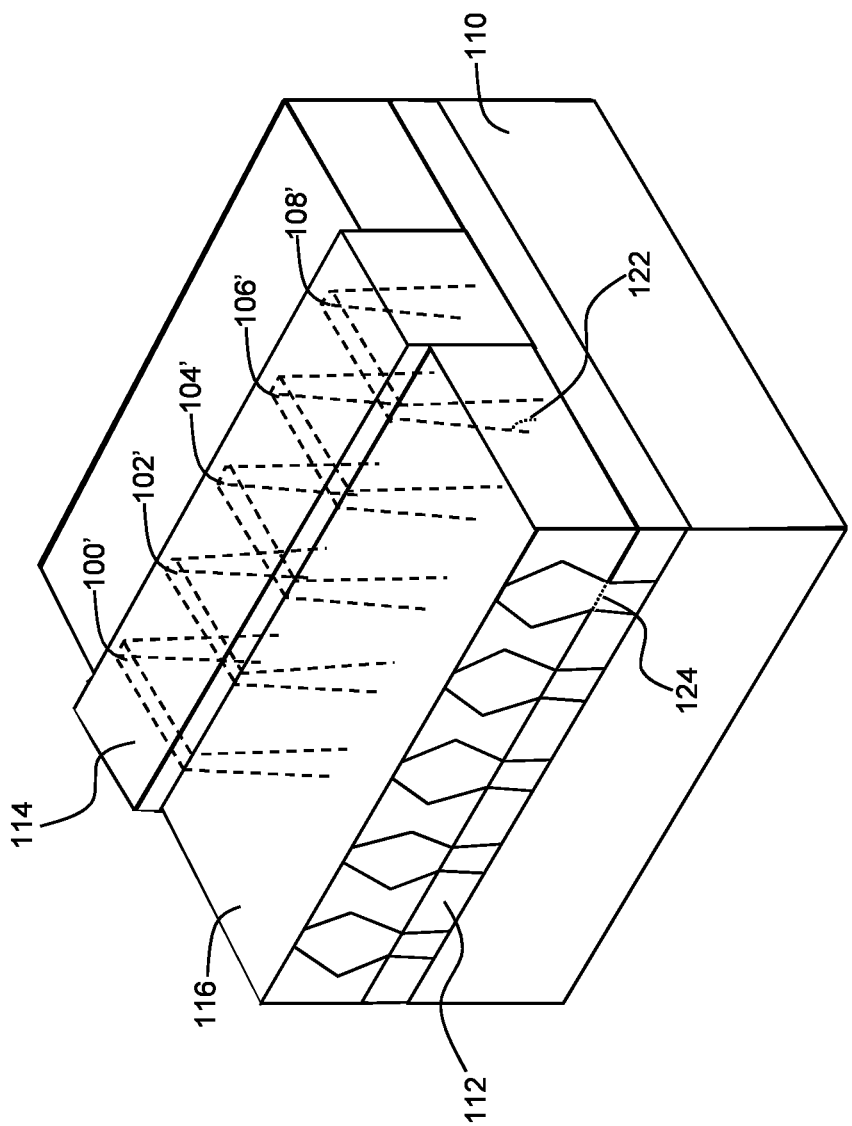

Reference is now made to FIGS. 1A-1D which are simplified conceptual illustrations useful in understanding the invention, where FIGS. 1A-1D show integrated circuit structures on a semiconductor wafer at various stages during their fabrication. In FIG. 1A several silicon fins 100, 102, 104, 106, and 108 are shown, which will become fins of Fin Field-effect transistors (FinFET) in a Static Random Access Memory (SRAM) structure. Fins 100-108 are shown on a silicon substrate 110 of a semiconductor wafer, where an oxide layer 112 separates between fins 100-108. FIG. 1B shows a gate 114 deposited on top of, and perpendicular to, fins 100-108. FIG. 1C shows an additional oxide layer 116 deposited over fins 100-108 after each of fins 100-108 acquire additional epitaxial silicon above oxide layer 112 as shown at 118 with reference to fin 100. In FIG. 1C the geometry of each of fins 100-108 on either side of gate 114 appears as shown in dashed lines at 120, and the top of gate 114 is not covered by oxide layer 116. FIG. 1D shows the geometry of each of fins 100-108 within gate 114 after the same fabrication step as shown in FIG. 1C, at 100', 102', 104', 106', and 108' respectively. A fin side wall angle is indicated as dotted line 122, and a fin width critical dimension is indicated as dotted line 124.

Figure 2A:
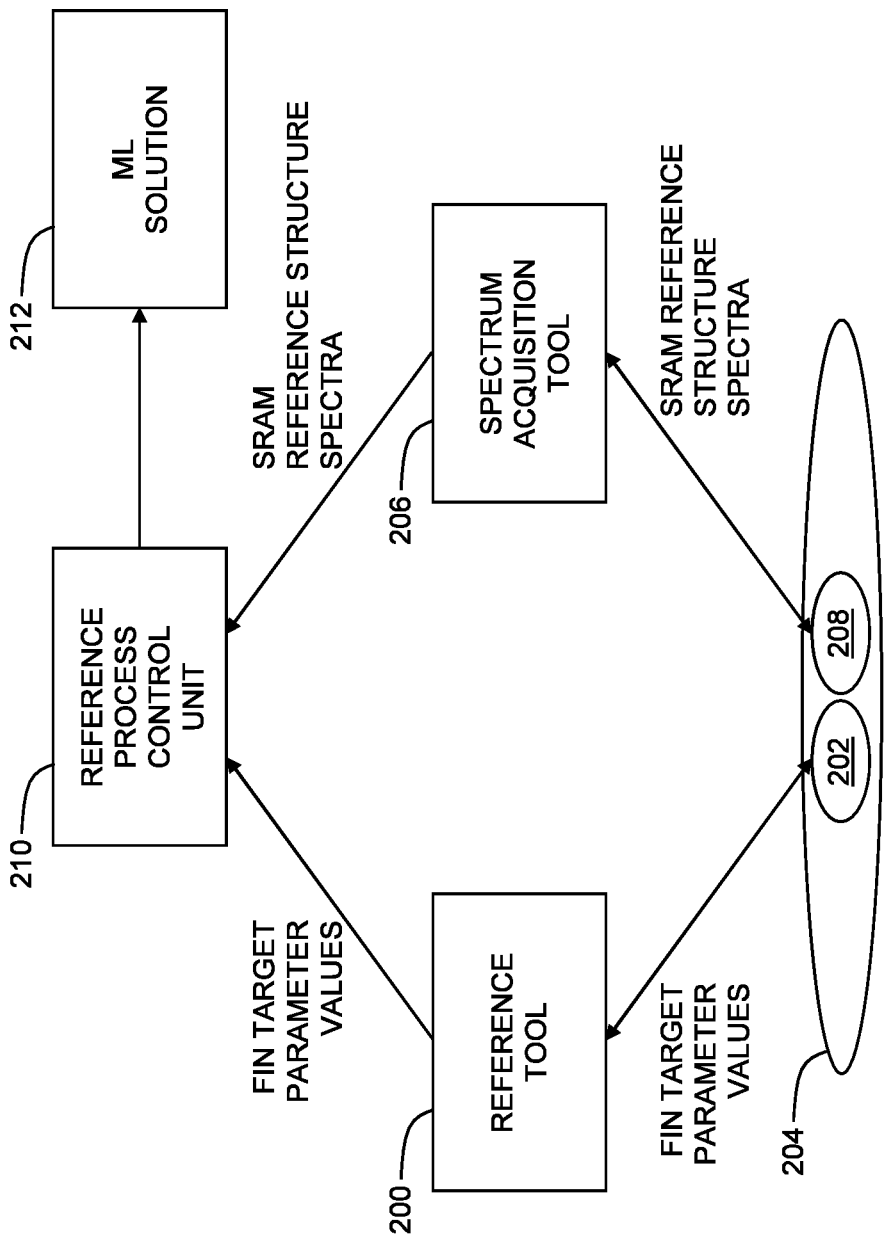
FIGS. 2A and 2B, taken together, is a simplified conceptual illustration of a system for measuring Static Random Access Memory (SRAM) structures having Fin Field-effect transistors (FinFET), constructed and operative in accordance with an embodiment of the invention.
Figure 2B:
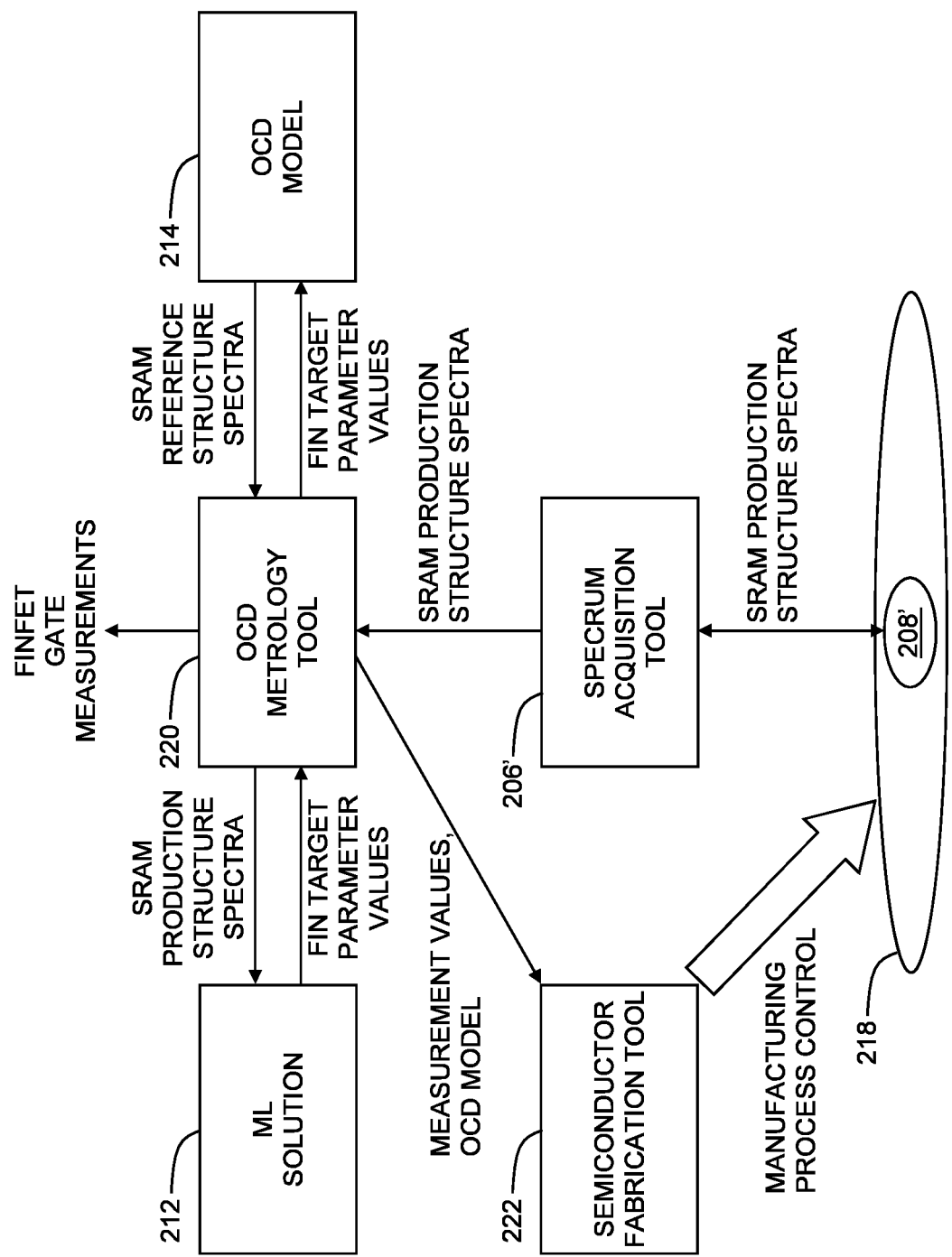

Reference is now made to FIGS. 2A and 2B, which, taken together, is a simplified conceptual illustration of a system for measuring Static Random Access Memory (SRAM) structures having Fin Field-effect transistors (FinFET), constructed and operative in accordance with an embodiment of the invention. In FIG. 2A, a reference tool 200, such as a Critical Dimension Scanning Electron Microscope (CD-SEM), an Atomic Force Microscope (AFM), a Critical Dimension Atomic Force Microscope (CD-AFM), or an OCD metrology tool, such as spectral ellipsometer (SE), Spectral Reflectometer (SR), Polarized Spectral Reflectometer, etc., is employed during a reference process, such as a Design of Experiment (DOE) process, during which one or more reference semiconductor wafers are fabricated under various conditions to produce integrated circuit structures for study prior to high-volume manufacturing of such wafers and structures. During the reference process, reference tool 200 is used to measure a fin target 202 on a reference semiconductor wafer 204. Fin target 202 is preferably selected such that it includes a layout of exposed FinFET fins lacking FinFET gates. In accordance with conventional techniques, reference tool 200 measures fin target 202 to produce a predefined set of fin target parameter values corresponding to various geometric parameters of the exposed FinFET fins of fin target 202.

A spectrum acquisition tool 206 is also employed during the reference process to measure a SRAM reference structure 208 on reference semiconductor wafer 204 by recording spectra associated with SRAM reference structure 208, such as by performing spectrum photometry on SRAM reference structure 208. SRAM reference structure 208 is preferably selected such that it includes a layout of FinFET fins having FinFET gates, where the layout of the exposed FinFET fins of fin target 202 is substantially similar to or identical to the layout of FinFET fins of SRAM reference structure 208.

Reference tool 200 and spectrum acquisition tool 206 preferably perform the above measurements for multiple pairs of fin targets 202 and SRAM reference structures 208 on one or more reference semiconductor wafers 204 to obtain multiple fin target parameter values and SRAM reference structure spectra, preferably where the different pairs of fin targets and SRAM reference structures have varying physical dimensions. In one embodiment, fin target 202 and SRAM reference structure 208 in any of the pairs are located at different locations on the same semiconductor wafers 204, and are measured after the same fabrication step is performed or after different fabrication steps are performed. In one embodiment, fin target 202 and SRAM reference structure 208 in any of the pairs are located at the same location, or at substantially the same location, on the same semiconductor wafers 204 and are measured after different fabrication steps are performed. In one embodiment, fin target 202 is measured after an oxide etch-back process is performed (during which oxide is etched back selective to the silicon material of the fin) and before any other fabrication step is subsequently performed, and SRAM reference structure 208 is measured after poly-open chemical-mechanical planarization (CMP) is performed and before any other fabrication step is subsequently performed.

A reference process control unit 210 is configured to process fin target parameter values and SRAM reference structure spectra, such as those obtained for different pairs of fin targets 202 and SRAM reference structures 208 on reference semiconductor wafer 204 in the manner described above, by performing machine learning (ML) to identify correspondence between the fin target parameter values and the SRAM reference structure spectra, the results of which are represented as an ML solution 212. Such machine learning may employ any known ML technique suitable for identifying correspondence between fin target parameter values and SRAM reference structure spectra.

In FIG. 2B, an OCD model 214 is provided, where OCD model 214 is created in accordance with conventional techniques to model one or more SRAM production structures, such as a SRAM production structure 208', to be produced on production semiconductor wafers, such as a production semiconductor wafer 218, during a high-volume manufacturing (HVM) process of fabricating integrated circuits. An OCD metrology tool 220 is configured to obtain spectra associated with SRAM production structure 208' on production semiconductor wafer 218 during an HVM process, where SRAM production structure 208' includes FinFETs having both FinFET fins and FinFET gates. The spectra associated with SRAM production structure 208' are obtained in accordance with conventional techniques, such as using a spectrum acquisition tool 206', which may be spectrum acquisition tool 206 or another spectrum acquisition tool, and in the manner described above with reference to spectrum acquisition tool 206 in FIG. 2A. OCD metrology tool 220 identifies in ML solution 212 SRAM reference structure spectra corresponding to the spectra associated with SRAM production structure 208', and injects into OCD model 214 fin target parameter values from ML solution 212 corresponding to the identified SRAM reference structure spectra in ML solution 212. OCD metrology tool 220 then determines measurement values for the FinFET gates of SRAM production structure 208' by fitting a reference spectra associated with SRAM production structure 208' in OCD model 214 to the spectra associated with SRAM production structure 208'. OCD metrology tool 220 and spectrum acquisition tool 206' preferably operate as described above with respect to multiple SRAM production structures during fabrication of multiple production semiconductor wafers. OCD metrology tool 220 is preferably configured to provide any of the measurement values and OCD model 214 to a semiconductor fabrication tool 222 that causes semiconductor fabrication tool 222 to adjust one or more parameters of the HVM process implemented by semiconductor fabrication tool 222 to achieve a desired manufacturing output from semiconductor fabrication tool 222.

Figure 3:
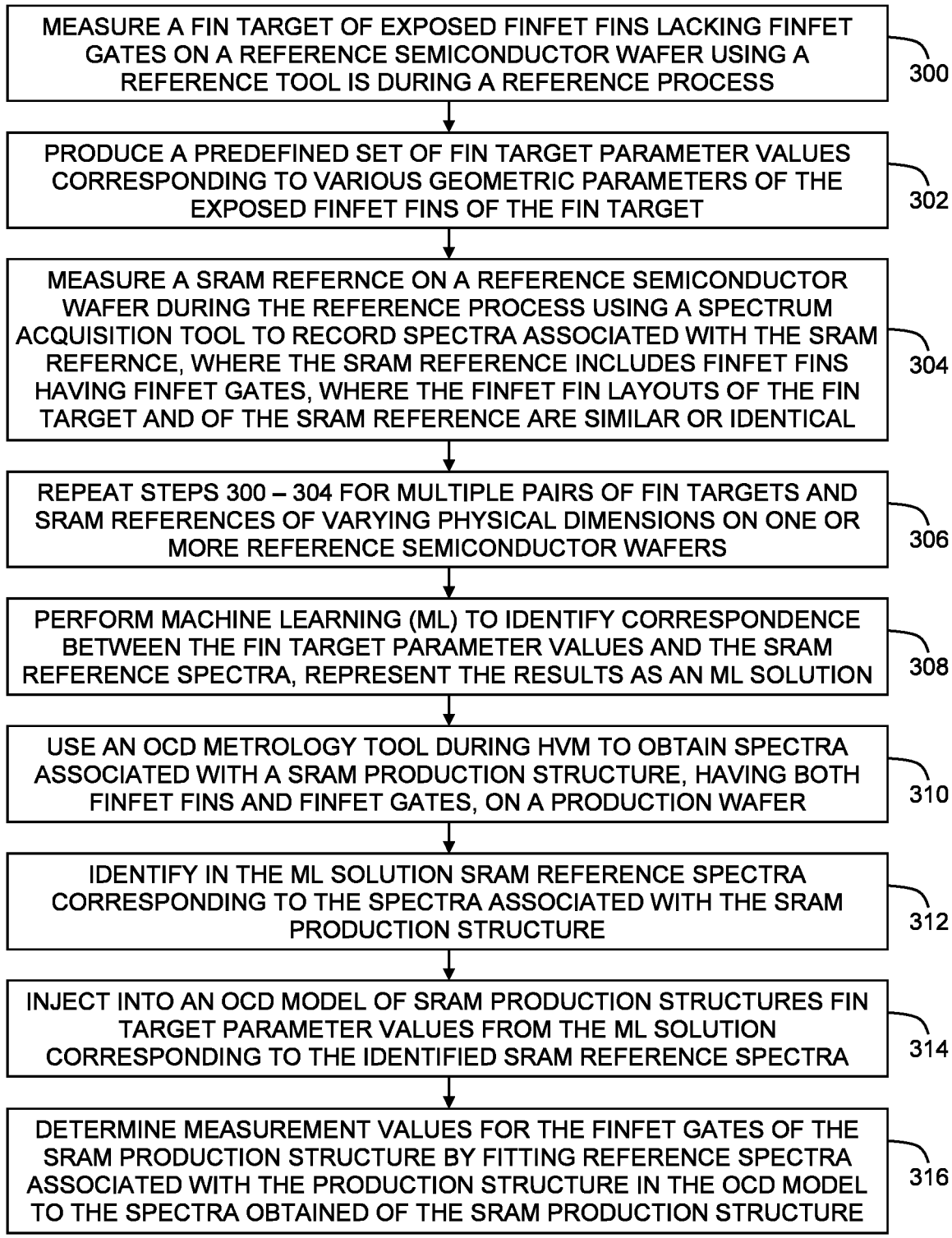
FIG. 3 is a simplified flowchart illustration of an exemplary method of operation of the system of FIGS. 2A and 2B, operative in accordance with an embodiment of the invention.

Reference is now made to FIG. 3 which is a simplified flowchart illustration of an exemplary method of operation of the system of FIGS. 2A and 2B, operative in accordance with an embodiment of the invention. In the method of FIG. 3, a reference tool is used during a reference process to measure a fin target of exposed FinFET fins lacking FinFET gates on a reference semiconductor wafer (step 300), and produce a predefined set of fin target parameter values corresponding to various geometric parameters of the exposed FinFET fins of the fin target (step 302). A spectrum acquisition tool is employed during the reference process to measure a SRAM reference structure on a reference semiconductor wafer by recording spectra associated with the SRAM reference structure, where the SRAM reference structure includes FinFET fins having FinFET gates, where the FinFET fin layouts of the fin target and of the SRAM reference structure are substantially similar or identical (step 304). Steps 300-304 are performed for multiple pairs of fin targets and SRAM reference structures of varying physical dimensions on one or more reference semiconductor wafers (step 306). Machine learning (ML) is performed to identify correspondence between the fin target parameter values and the SRAM reference structure spectra, the results of which are represented as an ML solution (step 308). An OCD metrology tool is used during a high-volume manufacturing (HVM) process of fabricating integrated circuits to obtain spectra associated with a SRAM production structure, having both FinFET fins and FinFET gates, on a production semiconductor wafer (step 310). SRAM reference structure spectra corresponding to the spectra associated with the SRAM production structure are identified in the ML solution (step 312). Fin target parameter values from the ML solution corresponding to the identified SRAM reference structure spectra are injected into an OCD model of SRAM production structures (step 314). Measurement values for the FinFET gates of the SRAM production structure are then determined by fitting reference spectra associated with the SRAM production structure in the OCD model to the obtained spectra associated with the SRAM production structure (step 316). Any of the measurement values and the OCD model are preferably provided to a semiconductor fabrication tool that causes the semiconductor fabrication tool to adjust one or more parameters of the HVM process implemented by the semiconductor fabrication tool to achieve a desired manufacturing output from the semiconductor fabrication tool.

The flowchart and block diagrams in the drawing figures illustrate the architecture, functionality, and operation of possible implementations of systems, methods, and computer program products according to various embodiments of the invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the drawing figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the invention have been presented for purposes of illustration, but are not intended to be exhaustive or limited to the embodiments disclosed. Many modifications and variations will be apparent to those of ordinary skill in the art without departing from the scope and spirit of the described embodiments. For example, the methods described herein can be employed on other types of structures on semiconductor wafers and are not limited to poly-open CMP SRAM measurement. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for measuring Static Random Access Memory (SRAM) structures having Fin Field-effect transistors (FinFET), comprising:
   during a reference process of fabricating integrated circuits,
      measuring in a fin target measuring step a fin target on a reference semiconductor wafer, thereby obtaining fin target parameter values, wherein the fin target includes a layout of exposed FinFET fins lacking FinFET gates,
      measuring in a SRAM reference structure measuring step a SRAM reference structure on the reference semiconductor wafer, thereby obtaining SRAM reference structure spectra,
         wherein the SRAM reference structure includes a layout of FinFET fins having FinFET gates, and
         wherein the layout of exposed FinFET fins of the fin target is substantially similar to or identical to the layout of FinFET fins of the SRAM reference structure,
      performing both of the measuring steps for a plurality of different pairs of fin targets and SRAM reference structures, and
      performing machine learning (ML) to identify correspondence between the fin target parameter values and the SRAM reference structure spectra, thereby producing an ML solution; and
   during a high-volume manufacturing (HVM) process of fabricating integrated circuits,
      obtaining a spectra associated with a SRAM production structure on a production semiconductor wafer, wherein the SRAM production structure includes a plurality of FinFET fins having FinFET gates,
      identifying in the ML solution SRAM reference structure spectra corresponding to the spectra associated with the SRAM production structure,
      injecting, into an Optical Critical Dimension (OCD) model of the SRAM production structure, fin target parameter values corresponding to the identified SRAM reference structure spectra in the ML solution, and
      determining measurement values for the FinFET gates of the SRAM production structure by fitting a reference spectra associated with the SRAM production structure in the OCD model to the spectra associated with the SRAM production structure.

2. The method according to claim 1 and further comprising:
   identifying a fabrication step performed on the reference semiconductor wafer after which the fin target includes the layout of exposed FinFET fins lacking FinFET gates; and performing the fin target measuring step after the identified fabrication step and before any other fabrication step is subsequently performed on the reference semiconductor wafer.

3. The method according to claim 2 wherein the identified fabrication step is an oxide etchback process during which oxide is etched back selective to silicon material of the FinFET fins.

4. The method according to claim 1 and further comprising:
   identifying a fabrication step performed on the reference semiconductor wafer after which the SRAM reference structure includes the layout of FinFET fins having FinFET gates; and
   performing the SRAM reference structure measuring step after the identified fabrication step and before any other fabrication step is subsequently performed on the reference semiconductor wafer.

5. The method according to claim 4 wherein the identified fabrication step is poly-open chemical-mechanical planarization (CMP) of the reference semiconductor wafer.

6. The method according to claim 1 wherein the fin target measuring step is performed using a Critical Dimension Scanning Electron Microscope (CD-SEM), an Atomic Force Microscope (AFM), a Critical Dimension Atomic Force Microscope (CD-AFM), or an OCD metrology tool.

7. The method according to claim 1 wherein the different pairs of fin targets and SRAM reference structures have varying physical dimensions.

8. The method according to claim 1 and further comprising providing any of the measurements and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

9. A method for measuring Static Random Access Memory (SRAM) structures having Fin Field-effect transistors (FinFET), comprising:
   obtaining spectra associated with a SRAM production structure on a production semiconductor wafer, wherein the SRAM production structure includes a plurality of FinFET fins having FinFET gates;
   identifying SRAM reference structure spectra corresponding to the spectra associated with the SRAM production structure, wherein the SRAM reference structure spectra were previously obtained from a measurement of a SRAM reference structure on a reference semiconductor wafer, the SRAM reference structure including a layout of FinFET fins having FinFET gates;
   injecting, into an Optical Critical Dimension (OCD) model of the SRAM production structure, fin target parameter values corresponding to the identified SRAM reference structure spectra, wherein the fin target parameter values were previously obtained from a measurement of a fin target on the reference semiconductor wafer, the fin target including a layout of exposed FinFET fins lacking FinFET gates, the layout of the FinFET fins of the fin target being substantially similar to or identical to the layout of the FinFET fins of the SRAM reference structure, and wherein correspondence between the fin target parameter values and the SRAM reference structure spectra was previously identified by machine learning (ML); and
   determining measurement values for the FinFET gates of the SRAM production structure by fitting reference spectra associated with the SRAM production structure in the OCD model to the spectra associated with the SRAM production structure.

10. The method according to claim 9 wherein the obtaining, identifying, injecting, and determining are performed during a high-volume manufacturing (HVM) process of fabricating integrated circuits.

11. The method according to claim 9 and further comprising:
    measuring in a fin target measuring step, the fin target on the reference semiconductor wafer, thereby obtaining the fin target parameter values;
    measuring in a SRAM reference structure measuring step the SRAM reference structure on the reference semiconductor wafer, thereby obtaining the SRAM reference structure spectra;
    performing both of the measuring steps for a plurality of different pairs of fin targets and SRAM reference structures; and
    performing the ML to identify correspondence between the fin target parameter values and the SRAM reference structure spectra.

12. The method according to claim 11 wherein the measuring steps and the implementing are performed during a reference process of fabricating integrated circuits prior to the obtaining, identifying, injecting, and determining.

13. The method according to claim 12 and further comprising:
    identifying a fabrication step performed on the reference semiconductor wafer after which the fin target includes the layout of exposed FinFET fins lacking FinFET gates; and
    performing the fin target measuring step after the identified fabrication step and before any other fabrication step is subsequently performed on the reference semiconductor wafer.

14. The method according to claim 13 wherein the identified fabrication step is an oxide etchback process during which oxide is etched back selective to silicon material of the FinFET fins.

15. The method according to claim 12 and further comprising:
    identifying a fabrication step performed on the reference semiconductor wafer after which the fin target includes the layout of exposed FinFET fins having FinFET gates; and
    performing the SRAM reference structure measuring step after the identified fabrication step and before any other fabrication step is subsequently performed on the reference semiconductor wafer.

16. The method according to claim 15 wherein the identified fabrication step is poly-open chemical-mechanical planarization (CMP) of the reference semiconductor wafer.

17. The method according to claim 11 wherein the fin target measuring step is performed using a Critical Dimension Scanning Electron Microscope (CD-SEM), an Atomic Force Microscope (AFM), a Critical Dimension Atomic Force Microscope (CD-AFM), or an OCD metrology tool.

18. The method according to claim 11 wherein the different pairs of fin targets and SRAM reference structures have varying physical dimensions.

19. The method according to claim 10 and further comprising providing any of the measurement values and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

20. A system for measuring Static Random Access Memory (SRAM) structures having Fin Field-effect transistors (FinFET), comprising:
- a reference tool;
- a spectrum acquisition tool;
- a reference process control unit configured to process fin target parameter values and SRAM reference structure spectra for a plurality of different pairs of fin targets and SRAM reference structures on a reference semiconductor wafer by performing machine learning (ML) to identify correspondence between the fin target parameter values and the SRAM reference structure spectra, thereby producing an ML solution,
  - wherein the fin target parameter values are obtained from the fin targets by the reference tool,
  - wherein the SRAM reference structure spectra are obtained from the SRAM reference structures by the spectrum acquisition tool, and
  - wherein in each of the pairs of fin targets and SRAM reference structures the fin target includes a layout of exposed FinFET fins lacking FinFET gates, the SRAM reference structure includes a layout of FinFET fins having FinFET gates, and the layout of exposed FinFET fins of the fin target is substantially similar to or identical to the layout of FinFET fins of the SRAM reference structure; and
- an OCD metrology tool configured to
  - obtain spectra associated with a SRAM production structure on a production semiconductor wafer during an HVM process of fabricating integrated circuits, wherein the SRAM production structure includes a plurality of FinFET fins having FinFET gates,
  - identify in the ML solution SRAM reference structure spectra corresponding to the spectra associated with the SRAM production structure,
  - inject, into an OCD model of the SRAM production structure, fin target parameter values corresponding to the identified SRAM reference structure spectra in the ML solution, and
  - determine measurement values for the FinFET gates of the SRAM production structure by fitting reference spectra associated with the SRAM production structure in the OCD model to the spectra associated with the SRAM production structure.

21. The system according to claim 20 wherein the fin target parameter values are obtained after a given fabrication step is performed on the reference semiconductor wafer after which the fin target includes the layout of exposed FinFET fins lacking FinFET gates and before any other fabrication step is subsequently performed on the reference semiconductor wafer.

22. The system according to claim 20 wherein the reference tool is a Critical Dimension Scanning Electron Microscope (CD-SEM), an Atomic Force Microscope (AFM), a Critical Dimension Atomic Force Microscope (CD-AFM), or an OCD metrology tool.

23. The system according to claim 20 wherein the OCD metrology tool is configured to provide any of the measurement values and the OCD model to a semiconductor fabrication tool that causes the semiconductor fabrication tool to adjust one or more parameters of the HVM process implemented by the semiconductor fabrication tool to achieve a desired manufacturing output from the semiconductor fabrication tool.

* * * * *